US011072081B2

(12) United States Patent
Hanatani (10) Patent No.: US 11,072,081 B2
(45) Date of Patent: Jul. 27, 2021

(54) ROBOT SEALING STRUCTURE AND ROBOT

(71) Applicant: FANUC CORPORATION, Yamanashi (JP)

(72) Inventor: Kouhei Hanatani, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 113 days.

(21) Appl. No.: 16/716,775

(22) Filed: Dec. 17, 2019

(65) Prior Publication Data
US 2020/0230828 A1　Jul. 23, 2020

(30) Foreign Application Priority Data
Jan. 23, 2019　(JP) ............................. JP2019-009254

(51) Int. Cl.
*B25J 17/00* (2006.01)
*B25J 19/00* (2006.01)
*F16H 1/28* (2006.01)

(52) U.S. Cl.
CPC ............... *B25J 19/00* (2013.01); *B25J 17/00* (2013.01); *F16H 1/28* (2013.01)

(58) Field of Classification Search
CPC ........ B25J 17/00; B25J 19/00; B25J 19/0062; F16H 1/28; F16H 57/029
USPC .................................................... 74/490.05
See application file for complete search history.

(56) References Cited

U.S. PATENT DOCUMENTS

| 2004/0061392 | A1 | 4/2004 | Tachibana et al. | |
| 2011/0154937 | A1* | 6/2011 | Liu | ........................ B25J 19/00 |
| | | | | 74/490.05 |
| 2014/0224057 | A1* | 8/2014 | Tanaka | ..................... B25J 17/00 |
| | | | | 74/490.05 |
| 2019/0337165 | A1* | 11/2019 | He | ...................... B25J 19/0075 |

FOREIGN PATENT DOCUMENTS

| JP | 2001-254787 A | 9/2001 |
| JP | 2002-239970 A | 8/2002 |
| JP | 2003-259597 A | 9/2003 |
| JP | 2004-106068 A | 4/2004 |
| JP | 2016-165790 A | 9/2016 |

* cited by examiner

*Primary Examiner* — William C Joyce
(74) *Attorney, Agent, or Firm* — Maier & Maier, PLLC (57) ABSTRACT

Robot sealing structure includes a shaft end face of a shaft of a reducer, an attachment surface of an arm member, bolts for fixing the shaft and the arm member to each other, and a seal member arranged between the shaft end face and the attachment surface, a hollow hole including a center axis line of the shaft is provided in the shaft end face, an input gear housing portion for housing an input gear, and a gear housing portion for housing a gear driven by the input gear are provided in a periphery of the hollow hole, the periphery of the hollow hole is provided with a protruding portion formed between the input gear housing portion and the gear housing portion, and a hole for temporarily attaching or fixing the seal member in the protruding portion is provided.

10 Claims, 9 Drawing Sheets

ROBOT SEALING STRUCTURE AND ROBOT

CROSS-REFERENCE TO RELATED APPLICATIONS

This application is based on and claims priority to Japanese Patent Application No. 2019-009254 filed on Jan. 23, 2019, the content of which is incorporated herein by reference in its entirety.

FIELD

The present invention relates to a robot sealing structure and a robot.

BACKGROUND

In the related art, there is a known technology in which a packing is arranged at a periphery of a cover of an arm member of a robot to form a seal between the arm member and the cover (for example, see Japanese Unexamined Patent Application, Publication No. 2002-239970).

Furthermore, there is a known technology in which an O-ring is used to form a seal between an outer periphery surface of a reducer and an inner periphery surface of a hole provided in an arm member (for example, see Japanese Unexamined Patent Application, Publication No. 2001-254787).

In addition, there is a known technology in which an oil seal is provided at an outer periphery portion of a linear action rod which is used for a robot. (See Japanese Unexamined Patent Application, Publication No. 2016-165790, for example.) Also, a radial seal which is provided between a shaft and a housing is known. (See Japanese Unexamined Patent Application, Publication No. 2004-106068, and Japanese Unexamined Patent Application, Publication No. 2003-259597, for example.)

SUMMARY

A first aspect of this disclosure provides a robot sealing structure that forms a seal between a shaft of a reducer for driving and an arm member, the robot sealing structure includes a shaft end face of the reducer, an attachment surface of the arm member, the attachment surface coming into contact with the shaft end face, a plurality of bolts which fix the shaft and the arm member to each other in such a state where the shaft end face and the attachment surface are in surface contact, and a seal member which is arranged between the shaft end face and the attachment surface, the shaft end face is provided with a hollow hole which is a hole including a center axis line of the shaft and in which a plurality of gears of the reducer are arranged, and at a periphery of the hollow hole, an input gear housing portion which houses an input gear, and a gear housing portion which houses a gear driven by the input gear are provided, in the vicinity of the periphery of the hollow hole, the periphery of the hollow hole is provided with a protruding portion which is formed between the input gear housing portion and the gear housing portion and which protrudes toward an inside of the hollow hole, and a hole for temporarily attaching or fixing the seal member is formed in the protruding portion.

DETAILED DESCRIPTION

Figure 1:
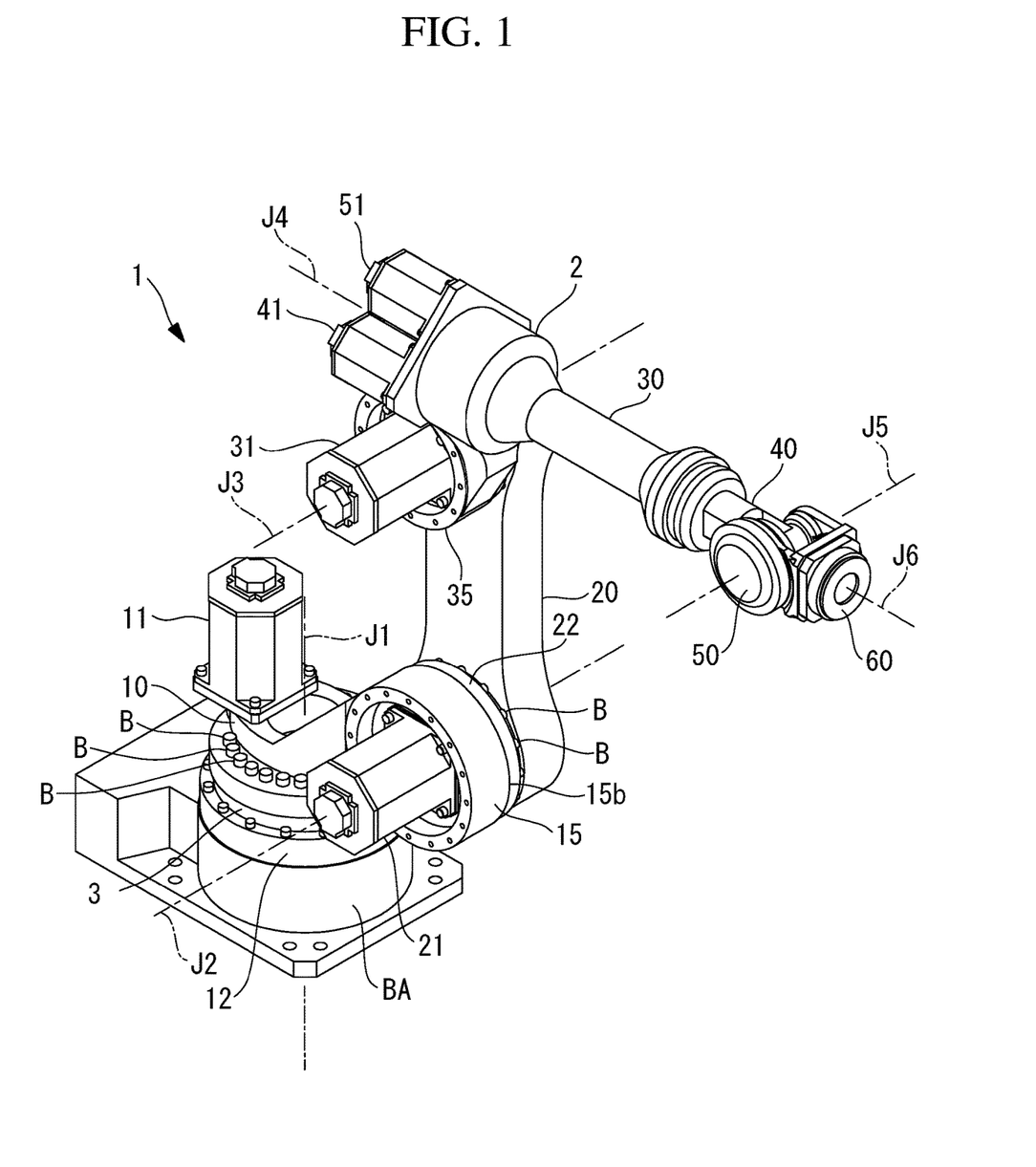
FIG. 1 is a perspective view of a robot according to an embodiment.

A robot 1 according to an embodiment will be described below with reference to the drawings. As shown in FIG. 1, the robot 1 of this embodiment has an arm 2, and any tool is attached to a distal end portion of the arm 2.

Figure 2:
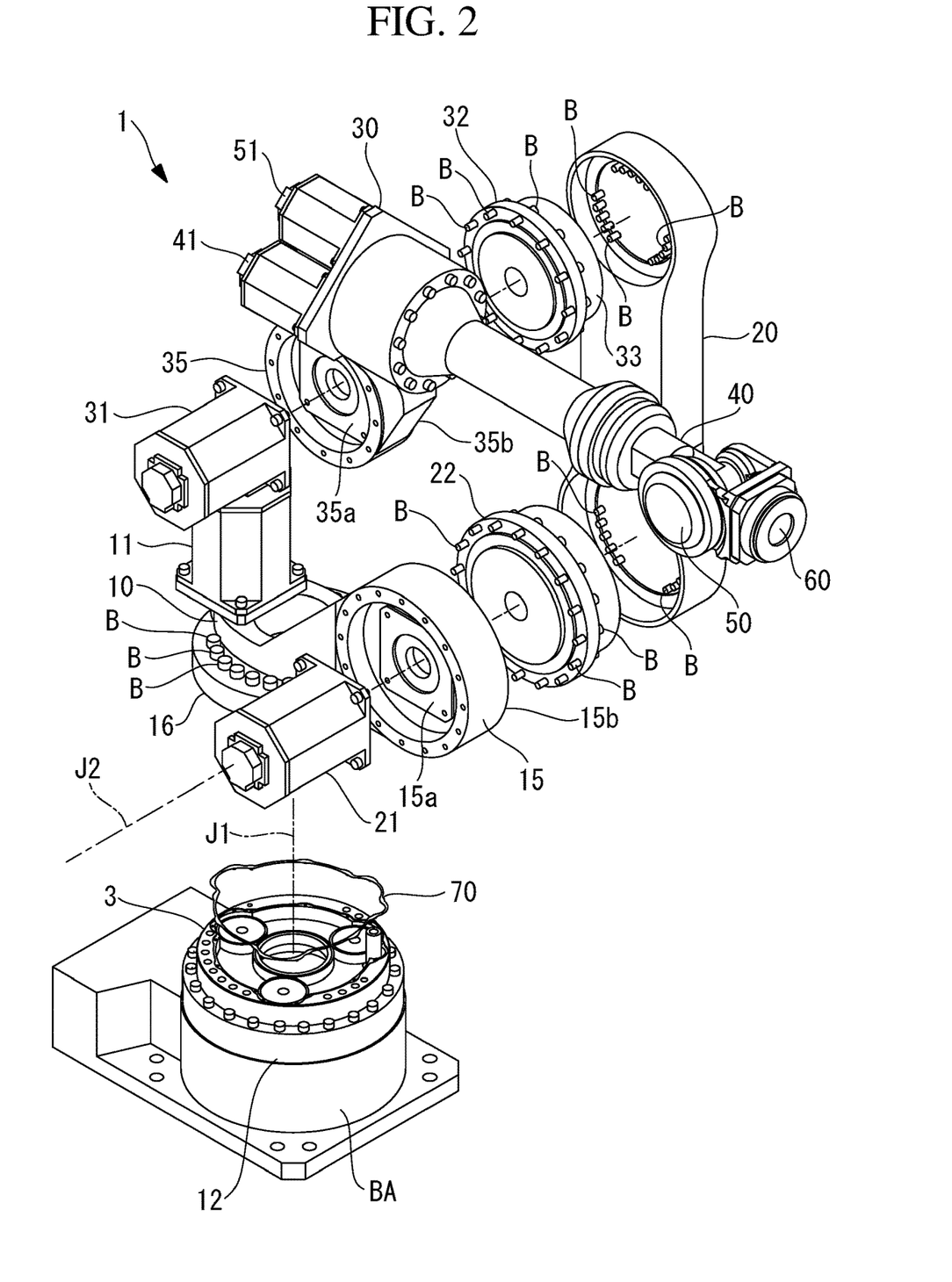
FIG. 2 is an exploded perspective view of the robot of this embodiment.

As shown in FIGS. 1, 2, and the like, the arm 2 includes a first arm member 10 which is supported by a base member BA, which is fixed to a predetermined installation surface, so as to be rotatable around a first axis line J1 which extends in an up and down direction, a second arm member 20 whose proximal end side is supported by the first arm member 10 so as to be swingable around a second axis line J2 which extends in a horizontal direction, and a third arm member 30 whose proximal end side is supported by a distal end side of the second arm member 20 so as to be swingable around a third axis line J3 which extends in a horizontal direction.

Also, the arm 2 includes a fourth arm member 40 which is supported by the third arm member 30 so as to be rotatable around a fourth axis line J4 which extends in the longitudinal direction of the third arm member 30, a fifth arm member 50 which is supported by the fourth arm member 40 so as to be swingable around a fifth axis line J5 which extends in a direction perpendicular to the fourth axis line J4, and a sixth arm member 60 which is supported by the fifth arm member 50 so as to be rotatable about a sixth axis line J6.

Moreover, the arm 2 includes a plurality of servomotors 11, 21, 31, 41, and 51 for respectively driving the first to fifth arm members 10 to 50, and the arm 2 also includes a servomotor, which is not shown, for driving the sixth arm member 60. Various types of servomotors, such as rotation motors and linear motors, can be used as each of the servomotors.

Next, the structure of the arm 2 will be described below. As shown in FIGS. 1 and 2, the first arm member 10 is attached to a shaft 3 of a reducer 12 for driving the first arm member 10 by means of a plurality of bolts B. A motor attachment surface 15a on which the servomotor 21 can be attached and a reducer attachment surface 15b which faces the direction opposite to the motor attachment surface 15a, and on which a reducer 22 for driving the second arm member 20 can be attached are provided at an upper end of the first arm member 10.

As shown in FIG. 2, a distal end side of the second arm member 20 is attached to the third arm member 30 via a reducer 32 for driving the third arm member 30 by means of a plurality of bolts B. A motor attachment surface 35a on which the servomotor 31 can be attached and a reducer attachment surface 35b which faces the direction opposite to the motor attachment surface 35a, and on which a reducer 32 for driving the third arm member 30 can be attached are provided at a proximal end side of the third arm member 30.

The reducer 32 is attached on the reducer attachment surface 35b by means of the plurality of bolts B, and an output shaft 33 of the reducer 32 is attached to the distal end side of the second arm member 20. For example, as shown in FIG. 2, the shaft 33 of the reducer 32 is attached to the distal end side of the second arm member 20 by means of the plurality of bolts B.

Figure 3:
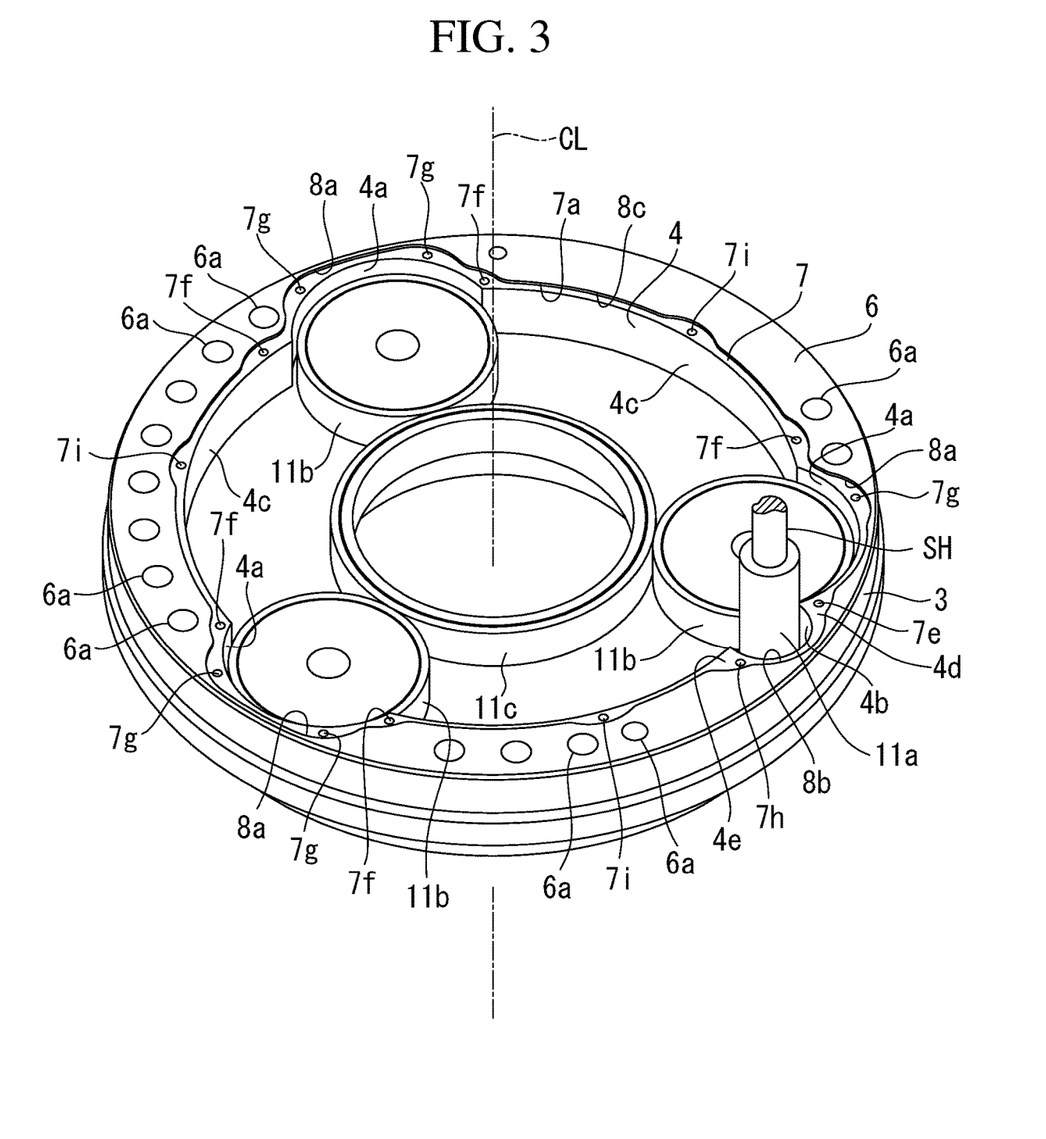
FIG. 3 is a perspective view of a main part of a reducer of the robot of this embodiment.
Figure 4:
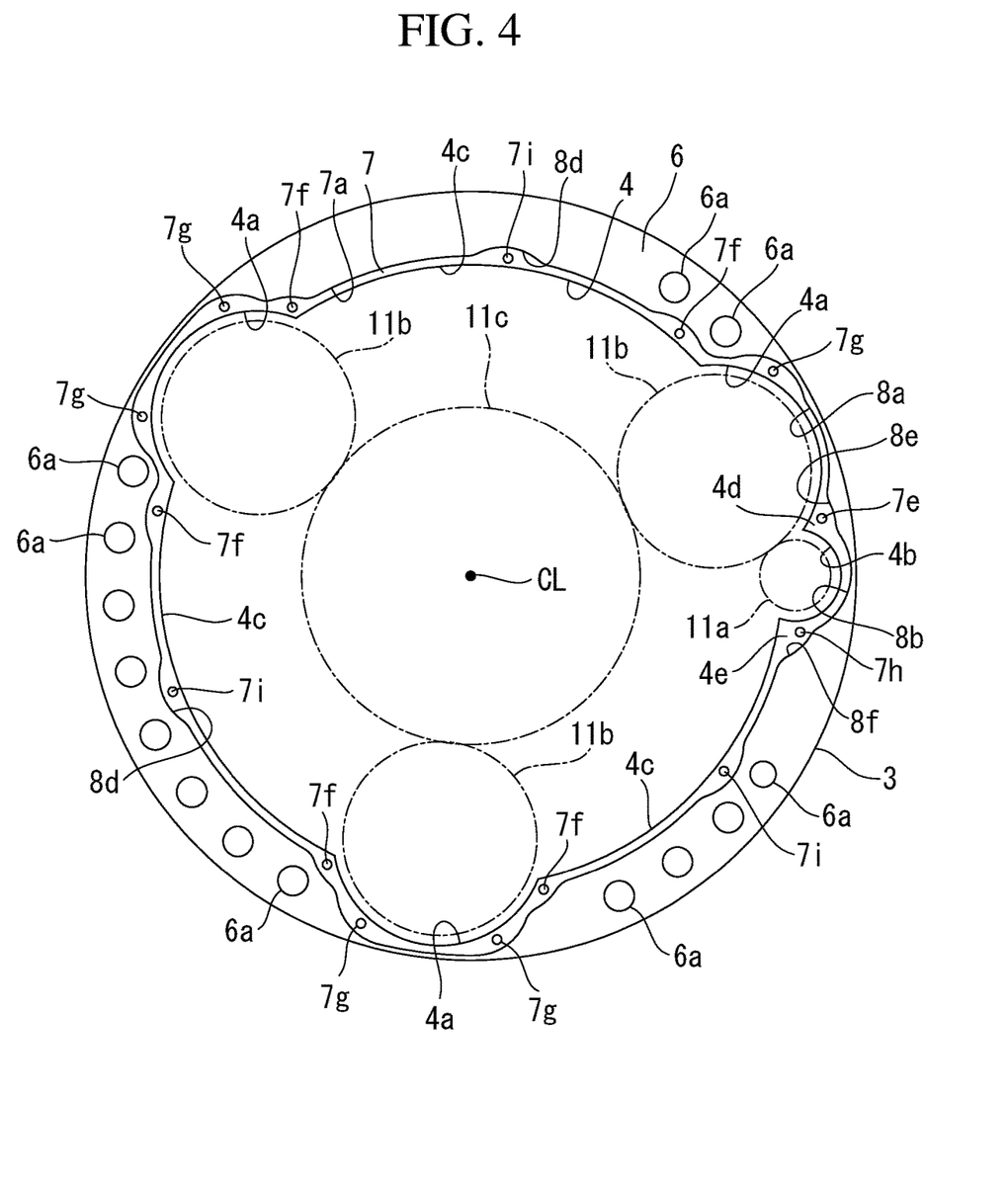
FIG. 4 is a plan view of the reducer of the robot of this embodiment.

As shown in FIG. 2, a shaft 3 of a reducer 12 is attached on an attachment surface 16, which is a bottom surface of the first arm member 10, by means of the plurality of bolts B. As shown in FIGS. 3 and 4, a hollow hole 4 is provided in a shaft end face 6 of the shaft 3, the hollow hole 4 extends in a direction which is along a center axis line CL of the shaft 3, and the hollow hole 4 includes the center axis line CL. An input gear 11a which is attached to an output shaft SH of the servo motor 11, a plurality of gears 11b which are arranged at an interval around the center axis line CL within the hollow hole 4, and a transmission gear 11c which rotates around the center axis line CL is arranged in the hollow hole 4. The input gear 11a is meshed with one of the plurality of gears 11b. Also, the transmission gear 11c is meshed with each of the plurality of gears 11b. Therefore, rotational force of the servo motor 11 is transmitted to one of the gears 11b via the input gear 11a, and rotational force of the gear 11b is transmitted to two remaining gears 11b via the transmission gear 11c.

The plurality of gears 11b are arranged at an interval around the center axis line CL, and the hollow hole 4 includes a plurality of gear housing portions 4a each of which has a shape formed along an outer periphery surface of each of the of gears 11. Each of the gear housing portions 4a has an arc shape formed along the outer periphery surface of each of the gears 11b. Also, the hollow hole 4 has an input gear housing portion 4b having a shape formed along an outer periphery surface of the input gear 11a. The input gear housing portion 4b has an arc shape formed along the outer periphery surface of the input gear 11a. The gear housing portions 4a and the input gear housing portion 4b are formed by a part of an inner periphery surface of the hollow hole 4.

The gear housing portions 4a and the input gear housing portion 4b are portions which are subjected to draught machining for accommodating the gears 11b and the input gears 11a in the hollow hole 4. Therefore, the gear housing portions 4a and the input gear housing portion 4b swell up in a direction which is away from the center axis line C with regard to other portions 4c of the inner periphery surface of the hollow hole 4. Also, one of the plurality of gear housing portions 4a is arranged side by side with the input gear housing 4b.

Each of the other portions 4c of the inner periphery surface of the hollow hole 4 typically has an arc shape which is centered on the center axis line CL. Therefore, a changing point at which an extending direction of the inner periphery surface of the hollow hole 4 changes is formed between the other portion 4c of the inner periphery surface in the hollow hole 4 and the gear housing portion 4a, and the other portion 4c and the input gear housing portion 4b. Also, the input gear 11a is small and the input gear housing portion 4b is also small. Therefore, a protruding portion 4d, which protrudes toward an inside the hollow hole 4, is formed between one of the plurality of gear housing portions 4a and the input gear housing portion 4b.

Figure 6:
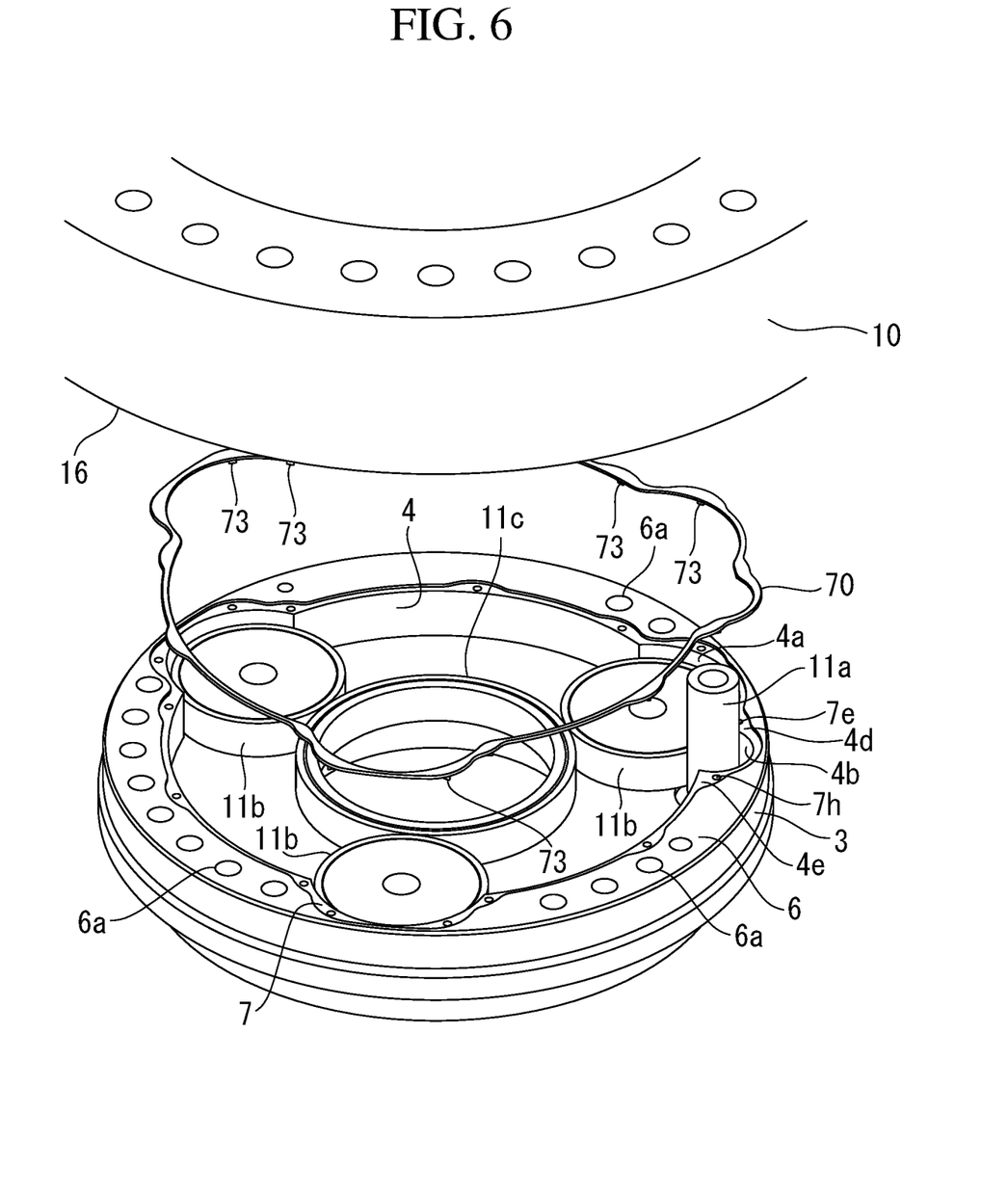
FIG. 6 is a perspective view of a main part of a first arm member and the reducer of the robot of this embodiment.

As shown in FIGS. 3 and 4, a plurality of holes 6a are provided in a shaft end face 6 which is an end face of the shaft 3. Each of the holes 6a is a screw hole for bolt fastening, for example. As shown in FIGS. 2 and 6, an attachment surface 16 which is a substantially vertical surface with respect to the first axis line J1, and with which the shaft end face 6 surface comes into surface contact is provided at a lower surface of the first arm member 10. In the attachment surface 16, a plurality of through holes, which are not shown, are provided at a position corresponding to each of the holes 6a.

A recessed flat portion 7 is formed in the shaft end face 6. The recessed flat portion 7 is a portion which is lowered by one to several millimeters, for example, with respect to the shaft end face 6 in a direction which is along the center axis line CL. Also, the recessed flat portion 7 is continuous over the entire periphery surface around the center axis line CL. In one example, the recessed flat portion 7 is a flat surface which is formed by performing milling and the like on the shaft end face 6. It is not absolutely necessary that a space which is formed by the recessed flat portion 7 is connected to a space which is formed by the hollow hole 4 and the attachment surface 16 of the first arm member 10.

In the attachment surface 16, the shaft end face 6 and the recessed flat portion 7, and a portion which faces the direction along the center axis line CL are typically a flat surface. Also, a partial area of the attachment surface 16 and at least a partial area of the recessed flat portion 7 are opposed to each other in the direction which is along the center axis line CL, and the opposing area is continuous over the entire periphery surface around the center axis line CL.

Figure 5:
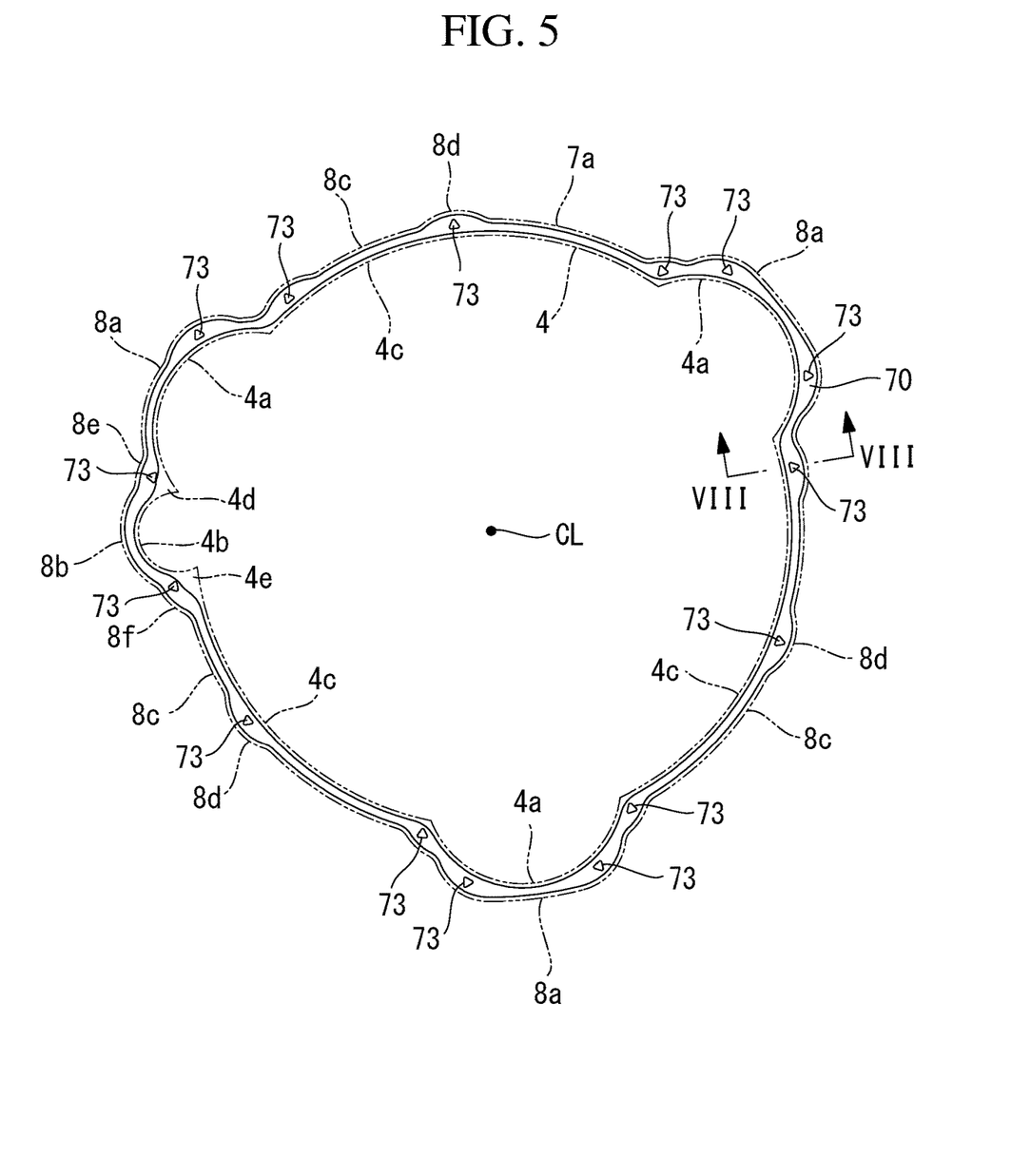
FIG. 5 is a bottom view of a seal member of the robot of this embodiment.

Relationship between an outer periphery 7a of the recessed flat portion 7 and an edge of the hollow hole 4 which is formed in the shaft end face 6 are shown in FIG. 5. As shown in FIG. 5, the outer periphery 7a includes a plurality of first portions 8a which respectively extend along the plurality of gear housing portions 4b, a second portion 8b which extends along the input gear housing portion 4b, and a plurality of third portions 8c each of which has a substantially arc shape, and each of which respectively extends along the plurality of other portions 4c of the hollow hole 4. Each of the third portions 8c is provided with a fourth portion 8d which swells up in the direction away from the center axis line CL.

A position corresponding to the changing point of the inner periphery surface of the hollow hole 4 in the outer periphery 7a and a position corresponding to the protruding portion 4d or a position in the vicinity thereof have a changing point which changes an extending direction of the outer periphery edge 7a.

Figure 7:
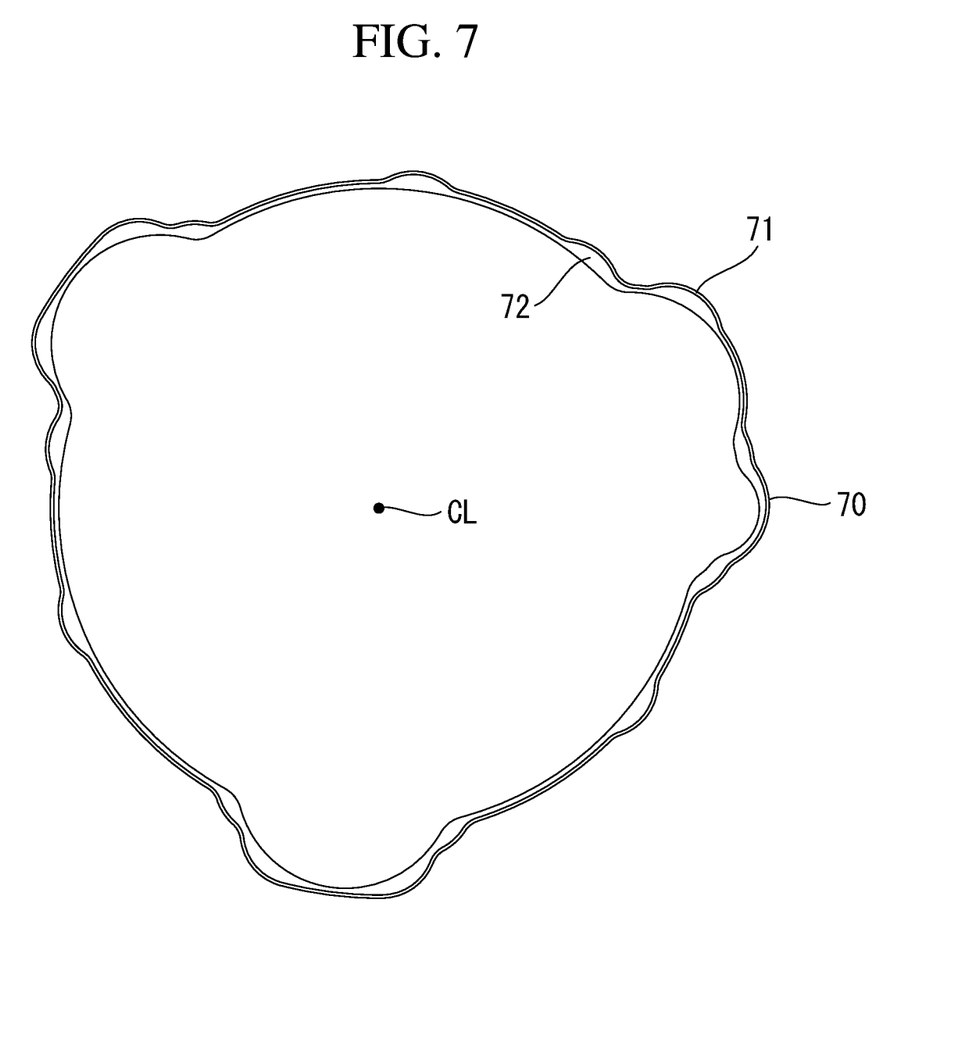
FIG. 7 is a plan view of the seal member of the robot of this embodiment.

As shown in FIG. 6, at the time of fixing the shaft end face 6 to the attachment surface 16, a seal member 70 is arranged between the shaft end face 6 and the attachment surface 16. The shape of the seal member 70 is shown in FIGS. 5 and 7. FIG. 5 is a view showing the seal member 70 which is seen from the shaft 3 side, FIG. 7 is a view showing the seal member 70 which is seen from the first arm member 10 side, and FIG. 8 is a sectional view cut along VIII-VIII line in of FIG. 5.

The seal member 70 is made of a material having oil resistance, for example, the seal member 70 is made from a material having rubbery elasticity, such as nitrile butadiene rubber (NBR), acrylic rubber (ACM), fluoro-rubber, silicon rubber, and the like. As shown in FIGS. 7 and 8, the seal member 70 includes a seal body 71 which is continuous over the entire periphery surface around the center axis line CL, and a rib portion 72 which extends from the seal body 71 in a direction intersecting the center axis line CL, which is typically a direction substantially orthogonal to the center axis line CL. In this embodiment, the rib portion 72 extends from the seal body 71 in a direction which is approaching to the center axis line CL, however, the rib portion 72 may extends from the seal body 71 in a direction which is away from the center axis line CL.

Figure 8:
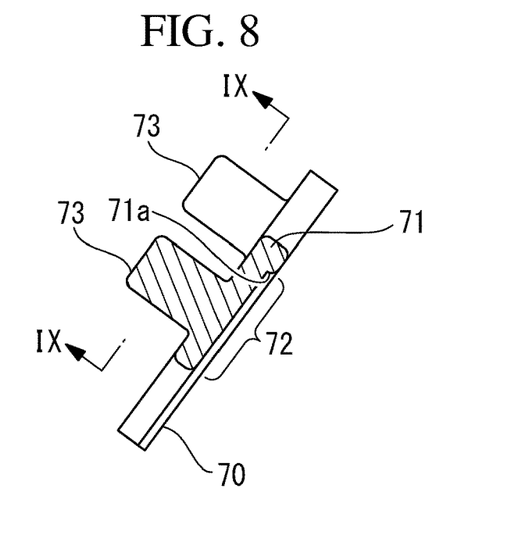
FIG. 8 is a sectional view cut along the VIII-VIII line in FIG. 5.

As shown in FIG. 8, the seal body 71 has a seal portion 71a which is typically referred to as a bead portion, a lip portion, and the like. In this embodiment, the seal portion 71a is a protruding portion protruding in the direction which is along the center axis line CL. The seal portion 71a may be a portion of which size is larger than the other portion in the direction along the center axis line CL. The seal portion 71a is formed over the entire periphery surface of the seal body 71. The seal body 71 has a function which forms a seal between the shaft end face 6 and the attachment surface 16.

The seal body 71 is arranged at the opposing area, a partial area of the attachment surface 16 and at least a partial area of the recessed flat portion, which is continuous over the entire periphery surface around the center axis line CL. Here, the hollow hole 4 has the plurality of other portions 4c, and the plurality of gear housing portions 4a and the input gear housing portion 4b which are located further away from the center axis line CL than the other portions 4c. Also, in the inner periphery surface of the hollow hole 4, a changing point at which the extending direction of the inner periphery surface of the hollow hole 4 changes is formed between the other portions 4c, and the gear housing portions 4a and the input gear portion 4b. Further, the protruding portion 4d which protrudes toward the inside the hollow hole 4 is formed between the gear housing portion 4a and the input gear housing portion 4b. Therefore, the opposing area has a shape which is formed along the edge of the hollow hole 4. That is to say, the shape of the opposing area is not a simple shape, such as a round shape, an elliptical shape, an oval shape, and the like, but, the shape of the opposing area has a changing point which corresponds to the above described changing point.

In this embodiment, the seal body 71 has a shape which is formed along the outer periphery 7a of the recessed flat portion 7. Therefore, the shape of the seal body 71 also has a seal shape changing point which corresponds to a part or all of the above described changing point on the outer periphery 7a.

A groove for accommodating the seal body 71 or the seal portion 71a is not provided in the area of the recessed flat portion 7 and the area of the shaft end face 6 which are corresponding to the opposing area. As described above, the opposing area is not in a simple shape, and it requires high cost to perform precise grooving on such area for sealing, which is not preferable. In this embodiment, a plurality of holes 7e, 7f, 7g, 7h, 7i are provided in the recessed flat portion 7, and each of the holes 7e, 7f, 7g, 7h, 7i are arranged in the opposing area or a position in the vicinity thereof (refer to FIGS. 3 and 4). Each of the holes 7e, 7f, 7g, 7h, 7i is formed by drilling using a drill, and a cross-sectional shape thereof is a round shape.

Figure 9:
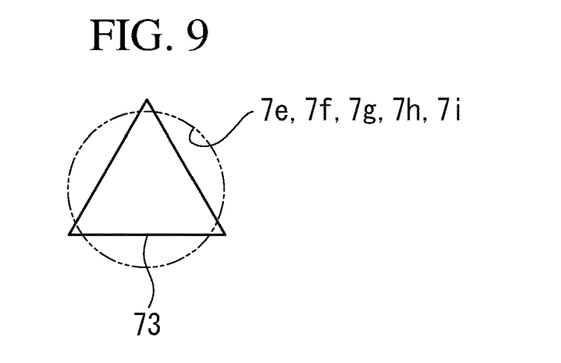
FIG. 9 is a sectional view cut along the IX-IX line in FIG. 8.

On the other hand, temporary fixing members 73 are provided on the rib member 72 of the seal member 70. Each of the temporary fixing members 73 is in a column shape extending in a direction along the center axis line CL. In this embodiment, as shown in FIG. 9, a cross-sectional shape of each of the temporary fixing members 73 is a polygonal shape, such as a triangle shape, a rectangle shape, and the like, and in this embodiment, the cross-sectional shape of each of the temporary fixing members 73 is a triangle shape. The cross-sectional shape of each of the temporary fixing members 73 may be a polygonal shape, such as a star shape and the like. In these cases, for example, as shown in FIG. 9, the external shape of each of the temporary fixing members 73 is larger than an inner diameter of the holes 7e, 7f, 7g, 7h, 7i. Also, the area of the cross section of the temporary fixing members 73 is smaller than the area of a cross section of the holes 7e, 7f, 7g, 7h, 7i. Therefore, it is easy to insert the temporary fixing members 73 into the holes 7e, 7f, 7g, 7h, 7i, and it is hard for the temporary fixing members 73 to fall out from the 7e, 7f, 7g, 7h, 7i. It is also possible to form the temporary fixing members 73 into a round shape in cross section.

In this embodiment, the below described configuration is adopted in order to prevent the bead portion of the seal member 70 from coming off inward from the edge of the recessed flat portion 7. First, the temporary fixing member 73 and the hole 7e are arranged at the protruding portion 4d which is between one of the plurality of gear housing portions 4a and the input gear housing portion 4b. In other words, the hole 7e is arranged in the vicinity of a connecting portion 8e of the first portion 8a and the second portion 8b. Also, with the seal member 70, the width dimension of the rib portion 72 is increased in a region corresponding to the protruding portion 4d. The width dimension of the rib portion 72 gradually changes toward a circumferential direction of the seal member 70. The width dimension of the rib portion 72 is a dimension in a radial direction of the shaft 3. The holes 7e may be a hole for temporarily fixing the seal member 70 or a hole for fixing the seal member 70.

Also, with the seal member 70, the width dimension of the rib portion 72 is increased in a region corresponding to the changing point which is between the other portion 4c of the hollow hole 4 and the gear housing portion 4a. In this embodiment, the width dimension of the rib portion 72 is increased at least at a part of the surrounding area of a connecting portion of the first portion 8a and the third portion 8c. Here also, the width dimension of the rib portion 72 also gradually changes toward the circumferential direction of the seal member 70. Further, the temporary fixing members 73 and the holes 7f are arranged in the vicinity of the changing point which is between the other portion 4c of the hollow hole 4 and the gear housing portion 4a. In other words, the hole 7f is arranged in the vicinity of the connecting portion of the first portion 8a and the third portion 8c.

Moreover, the temporary fixing members 73 and the holes 7g are arranged at a position corresponding to the gear housing portions 4a which is between a pair of the holes 7f. Also, in this embodiment, the protruding portion 4e which protrudes toward the inside the hollow hole 4 is formed between the input gear housing portion 4b and the other portion 4c, and the temporary fixing member 73 and the hole 7h are arranged at the protruding portion 4e. In other words, the hole 7h is arranged in the vicinity of a connecting portion 8f of the second portion 8b and the third portion 8c. Also, the width dimension of the rib portion 72 is increased at a position corresponding to the protruding portion 4e. Here also, the width dimension of the rib portion 72 gradually changes toward the circumferential direction of the seal member 70.

Also, the width dimension of the rib portion 72 is increased at a position correspond to the fourth portions 8d, and the temporary fixing members 73 and the holes 7i are arranged at the position. Here, the width dimension of the rib portion 72 also gradually changes toward the circumferential direction of the seal member 70.

When each of the temporary fixing members 73 is inserted into the corresponding holes 7e, 7f, 7g, 7h, 7i, the seal member 70 is temporarily fixed to the recessed flat portion 7 which is formed in the shaft end face 6. In this state, the shaft end face 6 is brought into surface contact with the attachment surface 16, and the shaft 3 is fixed to the first arm member 10 by the plurality of bolts B. As described above, the sealing structure between the reducer 12 and the first arm member 10 is formed. Then, by the seal body 71 of the seal member 70, a seal is formed between the shaft end face 6 and the attachment surface 16 against lubricating oil and the like from the servo motor 11.

Also, a recessed flat portion 7 may be formed on the attachment surface 16 of the first arm member 10. In this case, the holes 7e, 7f, 7g, 7h, 7i are formed on the recessed flat portion 7, and it is not necessary to provide the recessed flat portion 7 on the shaft end face 6. Sealing structure which is the same as or similar to the above described can also be formed by other variations in arrangement of each of the elements.

It is also possible to provide the recessed flat portion 7 in the attachment surface 16, and to provide the holes 7e, 7g, 7g, 7h, 7i in the shaft end face 6, so the reverse arrangement is also possible. In this case also, in such a state where the seal member 70 is temporarily fixed by the holes 7e, 7f, 7g, 7h, 7i, the shaft 3 and the first arm member 10 are fastened to each other, and by this, the seal member 70 forms a seal between the shaft end face 6 and the attachment surface 16.

In addition, sealing structure between the proximal end side of the second arm member 20 and the reducer 22, sealing structure between the distal end side of the second arm member 20 and the reducer 32 can also be formed in the same or the similar way as described above. Also, in a case where a robot which has the shafts of the reducers attached to the other arm members 40 to 60 is made, sealing structure between the arm members 40 to 60 and the reducers thereof can be configured in the same or the similar way as described above.

In this embodiment, the sealing structure between the shaft 3 of the reducer 12 for driving the robot 1 and the arm member 10 of the robot 1 is shown. This sealing structure includes the shaft end face 6 of the reducer 12, and the attachment surface 16 which comes into surface contact with the shaft end face 16 in the arm member 10. Also, this sealing structure includes the plurality of bolts B for fixing the shaft 3 and the arm member 10 to each other in such a state where the shaft end face 6 and the attachment surface 16 are in surface contact. Also, the hole 7e for temporarily fixing or fixing the seal member 70 in the protruding portion 4d which is formed between the input gear housing portion 4b and the gear housing portion 4a, and which protrudes toward the inside the hollow hole 4 is formed at a periphery of the hollow hole 4.

As described above, the hole 7e for temporarily fixing or fixing the seal member 70 is formed on the protruding portion 4d, so the seal member 70, which is thin and long, can be arranged between the shaft 3 and the arm member 10 in such a manner that the seal member 70 is prevented from dropping off to the side of the hollow hole 4.

Also, the sealing structure according to this embodiment further includes the plurality of holes 7e, 7f, 7g, 7h, 7i which are provided at the shaft end face 6 or the attachment surface 16, and the plurality of temporary fixing members 73 which are respectively inserted into the holes 7e, 7f, 7g, 7h, 7i.

With this configuration, the seal member 70 is temporarily fixed to the recessed flat portion 7. This is advantageous for easily and accurately positioning the seal member 70 at a predetermined position of the recessed flat portion 7, which is not a groove.

Furthermore, the sealing structure according to this embodiment includes the recessed flat portion 7 which is provided in part of one of the shaft end face 6 or the attachment surface 16. The recessed flat portion 7 is a portion which is recessed in the direction along the center axis line CL of the shaft 3 with respect to the shaft end face 6 or the attachment surface 16. As described above, since the seal member 70 is provided in the recessed flat portion 7, there is no member which may loosen the fastening between the shaft end face 6 and the attachment surface 16. This is advantageous for securely fastening the reducer 12 and the arm member 10.

In addition, a seal is formed between the shaft end face 6 and the attachment surface 16 by the seal member 70 which is arranged at the recessed flat portion 7. Therefore, in such a case where a region to be sealed does not extend in a circular manner around the center axis line CL of the shaft 3, it is possible to easily and reliably form a seal surface with which the seal member 70 is in contact. By adapting this configuration, it is possible to form the sealing surface at a low cost and reliably in comparison with a case where a groove for an O-ring which is not extending in the circular manner around the center axis line CL of the shaft 3 is formed.

Also, the temporary fixing members 73 in this embodiment are provided on the seal member 70, and the temporary fixing members 73 have rubbery elasticity. As described above, since the temporary fixing members 73 are provided on the seal member 70, it is easy to arrange the seal member 70 between the shaft end face 6 and the attachment surface 16.

Also, the temporary fixing members 73 may be bolts, pins, and the like which are separate components from the seal member 70. In such a case where the bolts are used as the temporary fixing members 73, the bolts are screwed into the holes 7e, 7f, 7g, 7h, 7i, which are female screw holes, and in such a case where the pins are used as the temporary fixing members 73, the pins are fitted into the holes 7e, 7f, 7g, 7h, 7i. In these cases, it is also possible to easily and reliably fix the seal member 70 temporarily at the predetermined position of the recessed flat portion 7. The bolts, the pins, and the like remain in the sealing structure, however, there is no particular problem.

Moreover, in this embodiment, the seal member 70 has the seal body 71 which is continuous over the entire periphery surface of the seal member 70, and a rib portion 72 which extends from the seal body 71 in the direction intersecting the center axis line CL of the shaft 3, and the seal body 71 forms a seal between the shaft end face 6 and the attachment surface 16. With this configuration, the rib portion 72 reinforces the seal body 71 in the direction intersecting the center axis line CL of the shaft 3. This configuration is advantageous for easily and reliably arranging the seal body 71, which is thin and long, at the predetermined position of the recessed flat portion 7.

Figure 10:
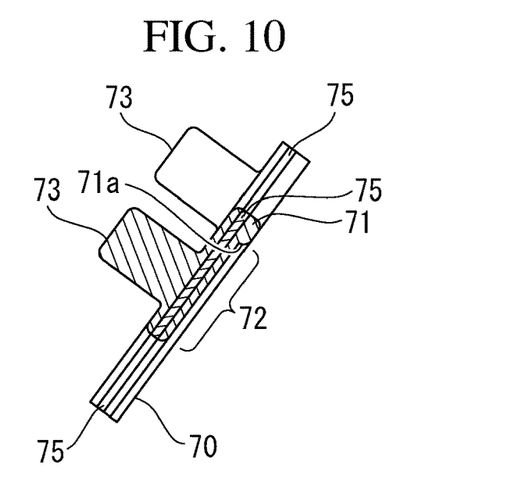
FIG. 10 is a cross-sectional view of the seal member showing a modified example of the sealing structure of this embodiment.

Also, as shown in FIG. 10, a plate-like reinforcing member 75 which extends in the direction orthogonal to the center axis line CL of the shaft 3 may be provided within the rib portion 72. In FIG. 10, rubber is vulcanized and adhered to surfaces of the reinforcing member 75 on the both sides in the thickness direction, however, rubber may be vulcanized and adhered to a surface of the reinforcing member 75 on one side in the thickness direction. In FIG. 10, the reinforcing member 75 is also arranged in the seal body 71, however, the reinforcing member 75 may be arranged only in the rib portion 72.

Also, with the sealing structure of this embodiment, the temporary fixing members 73 are provided in the rib portion 72 of the seal member 70. When the temporary fixing members 73 are arranged at a position corresponding to the seal body 71, it is highly possible that a part of the seal body 71 is arranged at the holes 7e, 7f, 7g, 7h, 7i. In this embodiment, the temporary fixing members 73 are not arranged at the position corresponding to the seal body 71. This is advantageous for improving seal performance and reliability.

Moreover, in this embodiment, a cross-sectional shape of each of the temporary fixing members 73 is a triangle shape. Also, as shown in FIG. 5, an extending direction of a side of the triangle, which is closest to the hollow hole 4, is along the direction in which the edge of the hollow hole 4 extends.

Therefore, it is possible to make an inner diameter of the seal member 70 larger as much as possible. To meet the demand and the like for reducing weight of the robot 1, the area of the shaft end face 6 tends to be smaller, and accordingly, the area where the seal member 70 is arranged is also smaller. The small protrusion of the seal member 70 toward inside the radial direction contributes to the weight reduction of the robot 1. Also, a cross-sectional shape of each of the temporary fixing members 73 is a rectangle shape, and an extending direction of a side of the rectangle, which is closest to the hollow hole 4, may extend along the direction in which the edge of the hollow hole 4 extends. This configuration also allows the same or the similar effect when the cross-sectional shape is a triangle.

Figure 11:
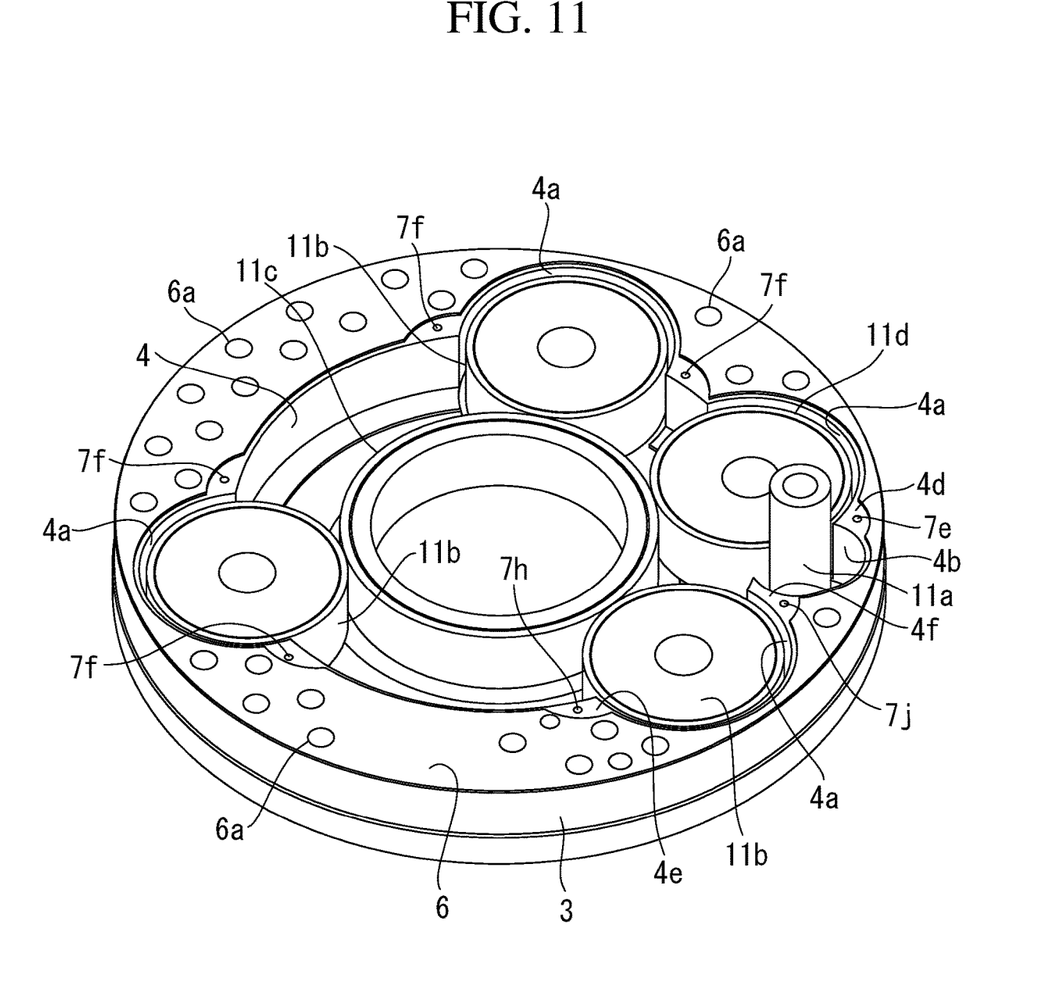
FIG. 11 is a perspective view of a main part of a reducer shaft showing a modified example of the reducer of this embodiment.

Also, as shown in FIG. 11, in the reducer 12, the rotational force of the input gear 11a may be transmitted to an idol gear 11d, and rotational force of the idol gear 11d may be transmitted to the three gears lib via the transmission gear 11c. In this case, the idol gear 11d is accommodated in the gear housing portion 4 of the hollow hole 4. Even with this configuration, the hole 7e for temporarily fixing or fixing the seal member 70 is formed on the protruding portion 4d which is formed between the input gear housing portion 4b and the gear housing portion 4a, and which protrudes toward the inside the hollow hole 4. Also, the hole 7j for temporarily fixing or fixing the seal member 70 is formed on the protruding portion 4f which is formed between the input gear housing portion 4b and the other one of the gear housing portions 4a in the circumferential direction, and which protrudes toward the inside the hollow hole 4. In addition, this aspect also includes the configuration of the seal member 70, the recessed flat portion 7, and the like, which are described in the above described embodiment. Therefore, the effects which are the same as or similar to the above described embodiment can be obtained.

With the above-described disclosure, it is possible to reliably fasten between the shaft of the reducer and the attachment surface of the arm member and to realize a highly reliable seal between the end face of the shaft and the attachment surface.

The invention claimed is:

1. A robot sealing structure that forms a seal between a shaft of a reducer for driving and an arm member, the robot sealing structure comprising:
 a shaft end face of the reducer;
 an attachment surface of the arm member, the attachment surface coming into contact with the shaft end face;
 a plurality of bolts which fix the shaft and the arm member to each other such that the shaft end face and the attachment surface are in surface contact; and
 a seal member which is arranged between the shaft end face and the attachment surface, wherein,
 the shaft end face is provided with a hollow hole which is a hole including a center axis line of the shaft and in which a plurality of gears of the reducer are arranged,
 an input gear housing portion which houses an input gear, and a gear housing portion which houses a gear driven by the input gear are provided in a periphery of the hollow hole,
 the periphery of the hollow hole is provided with a protruding portion which is formed between the input gear housing portion and the gear housing portion and which protrudes toward an inside of the hollow hole, and
 a hole for temporarily attaching or fixing the seal member is formed in the protruding portion.

2. The robot sealing structure according to claim 1, further comprising:
 a plurality of temporary fixing holes which are provided in the shaft end face or the attachment surface; and
 a plurality of temporary fixing members which are respectively inserted into the temporary fixing holes.

3. The robot sealing structure according to claim 2, wherein, the temporary fixing members are provided in the seal member, and the temporary fixing members have rubbery elasticity.

4. The robot sealing structure according to claim 3, wherein, a cross-sectional shape of each of the temporary fixing members is a polygonal shape.

5. The robot sealing structure according to claim 4, wherein the cross-sectional shape of each of the temporarily fixing members is a triangle shape or a rectangle shape, and
 an extending direction of a side of the triangle or the rectangle, which is closest to the hollow hole, is along a direction in which an edge of the hollow hole extends.

6. The robot sealing structure according to claim 2, wherein, the temporary fixing members are bolts which are screwed into the temporary fixing holes, or pins which are fitted into the temporary fixing holes.

7. The robot sealing structure according to claim 1, further comprising:
 a recessed flat portion which is provided in part of one of the shaft end face or the attachment surface;
 a plurality of temporary fixing holes which are provided in the recessed flat portion; and
 a plurality of temporary fixing members which are respectively inserted into the temporary fixing holes.

8. The robot sealing structure according to claim 1, wherein, the seal member includes a seal body which is continuous over an entire circumference, and a rib portion which extends from the seal body in a direction intersecting the center axis line, and the seal body forms a seal between the shaft end face and the attachment surface.

9. The robot sealing structure according to claim 8 further comprising:
 a plurality of temporary fixing holes which are provided in the shaft end face or the attachment surface; and a plurality of temporary fixing members which are respectively inserted into the temporary fixing holes.

10. A robot comprising a robot sealing structure that forms a seal between a shaft of a reducer for driving and an arm member, the robot sealing structure comprising:
 a shaft end face of the reducer;

an attachment surface of the arm member, the attachment surface coming into contact with the shaft end face;

a plurality of bolts which fix the shaft and the arm member to each other in such that the shaft end face and the attachment surface are in surface contact; and a seal member which is arranged between the shaft end face and the attachment surface, wherein, the shaft end face is provided with a hollow hole which is a hole including a center axis line of the shaft and in which a plurality of gears of the reducer are arranged, an input gear housing portion which houses an input gear, and a gear housing portion which houses a gear driven by the input gear are provided in a periphery of the hollow hole, the periphery of the hollow hole is provided with a protruding portion which is formed between the input gear housing portion and the gear housing portion and which protrudes toward an inside of the hollow hole, and a hole for temporarily attaching or fixing the seal member is formed in the protruding portion.

* * * * *